(12) United States Patent
Onishi et al.

(10) Patent No.: US 6,213,239 B1
(45) Date of Patent: Apr. 10, 2001

(54) STRUCTURE AND ARRANGEMENT OF THE RESERVE TANK FOR A MOTORCYCLE

(75) Inventors: Fumihiro Onishi, Hamakita; Kouji Isoe, Hamamatsu, both of (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 09/454,768

(22) Filed: Dec. 3, 1999

(30) Foreign Application Priority Data

Dec. 18, 1998 (JP) .................................................. 10-360733

(51) Int. Cl.⁷ .................................................. B62D 61/02
(52) U.S. Cl. ............................................ 180/219; 280/834
(58) Field of Search ............................ 180/219; 280/830, 280/833–835

(56) References Cited

U.S. PATENT DOCUMENTS 5,016,725 * 5/1991 Muramatsu ........................... 280/225
5,908,079 * 6/1999 Amino .................................. 180/219

FOREIGN PATENT DOCUMENTS 60-125322   4/1985   (JP) .................................. F01P/11/00

* cited by examiner

Primary Examiner—Brian L. Johnson
Assistant Examiner—L. Lum
(74) Attorney, Agent, or Firm—Darby & Darby

(57) ABSTRACT

A V-type two cylinder engine is transversally mounted by being supported between a truss frame and a body frame while the front cylinder is inclined forwards below the truss frame. A radiator is arranged above and in front of the cylinder head of the front cylinder. A fuel tank is mounted over the truss frame. A reserve tank is arranged in a sideways space inside the truss frame on the side opposite to the side to which the front carburetor on the top of the front cylinder is offset. The main body of the reserve tank is formed so as to extend from the front upper side to the rear lower side along the truss frame. The reserve tank has a water supply port projected upwards, so that the upper end of the water supply port, i.e., the water supply opening (cap) is arranged above the truss frame and under the fuel tank.

4 Claims, 6 Drawing Sheets

STRUCTURE AND ARRANGEMENT OF THE RESERVE TANK FOR A MOTORCYCLE

BACKGROUND OF THE INVENTION (1) Field of the Invention

The present invention relates to a structure and arrangement of the reserve tank for a motorcycle in which a reserve tank having an adequate tank capacity is arranged in the rear of the radiator.

(2) Description of the Prior Art

The radiator's reserve tank on motorcycles can be arranged at different positions. For example, in a typical motorcycle having a cowling, the reserve tank is arranged, in front of the radiator which is located on the front lower side of the motorcycle frame, on the transversally outer side of the front fork and on the inner side of the cowling. Japanese Utility Model Application Laid-Open Sho 60 No.125322 discloses a mounting structure in which the reserve tank is shaped in a transversally long configuration and arranged in the rear of the radiator and above the engine.

The above configuration in which the reserve tank is arranged in front of the radiator cannot be applied to a motorcycle which has no cowling and also suffers the problems in that the reserve tank interrupts the flow of air toward the radiator and in that the weight cannot be concentrated on the center of the vehicle. The mounting structure disclosed in Japanese Utility Model Application Laid-Open Sho 60 No.125322 produces difficulties in securing a sufficient capacity of the reserve tank. So, if a large reserve tank is designed, the vertical dimension of the motorcycle becomes large, resulting in the center of gravity becoming higher.

SUMMARY OF THE INVENTION

It is therefore an object of the present invention to provide a structure and arrangement of the reserve tank for a motorcycle which facilitates a reserve tank of an adequate capacity to be arranged in the rear of the radiator by making the best use of the space around the engine.

The present invention has been achieved to attain the above object and is configured as follows:

In accordance with the first aspect of the present invention, a structure and arrangement of the reserve tank in a motorcycle, includes: a V-type engine having cylinders in the front and in the rear, the front and rear cylinders being offset to the sides opposite to each other; and a reserve tank arranged in the sideways space opposite the side to which the front cylinder is offset or the upper sideways space.

In accordance with the second aspect of the present invention, the structure and arrangement of the reserve tank in a motorcycle having the above first feature is characterized in that a front carburetor is attached to the top of the front cylinder and the reserve tank is arranged at the side of the front carburetor.

In accordance with the third aspect of the present invention, the structure and arrangement of the reserve tank in a motorcycle having the above first feature, further comprises: a motorcycle frame arranged sidewards or upwards and sidewards of the front cylinder; and a fuel tank mounted over the motorcycle frame, and is characterized in that the reserve tank is arranged on the inner side of the motorcycle frame, and the reserve tank has a water supply port disposed under the fuel tank.

In accordance with the fourth aspect of the present invention, the structure and arrangement of the reserve tank in a motorcycle having the above second feature, further comprises: a motorcycle frame arranged sidewards or upwards and sidewards of the front cylinder; and a fuel tank mounted over the motorcycle frame, and is characterized in that the reserve tank is arranged on the inner side of the motorcycle frame, and the reserve tank has a water supply port disposed under the fuel tank.

In accordance with the invention of the above first feature, the sideways space opposite the side to which the front cylinder is offset or the upper sideways space can be made use of to arrange a reserve tank of an adequate capacity in the rear of the radiator without the necessity of enlarging the vertical dimensions of the motorcycle body. Accordingly, it is possible to absorb volume variation of the cooling water without degrading the cooling efficiency of the radiator.

In accordance with the invention of the above second feature, a greater space at the side of the front carburetor can be made use of to facilitate simple arrangement of the reserve tank while securing an adequate capacity.

In accordance with the inventions of the above third and fourth features, the reserve tank can be protected by the motorcycle frame so that it can be prevented from being damaged even if the motorcycle falls down or from other reasons. It is also possible to prevent such tampering as loading of foreign substances such as sand, fuel, etc. into the water supply port of the reserve tank.

DESCRIPTION OF THE PREFERRED EMBODIMENTS

Figure 1:
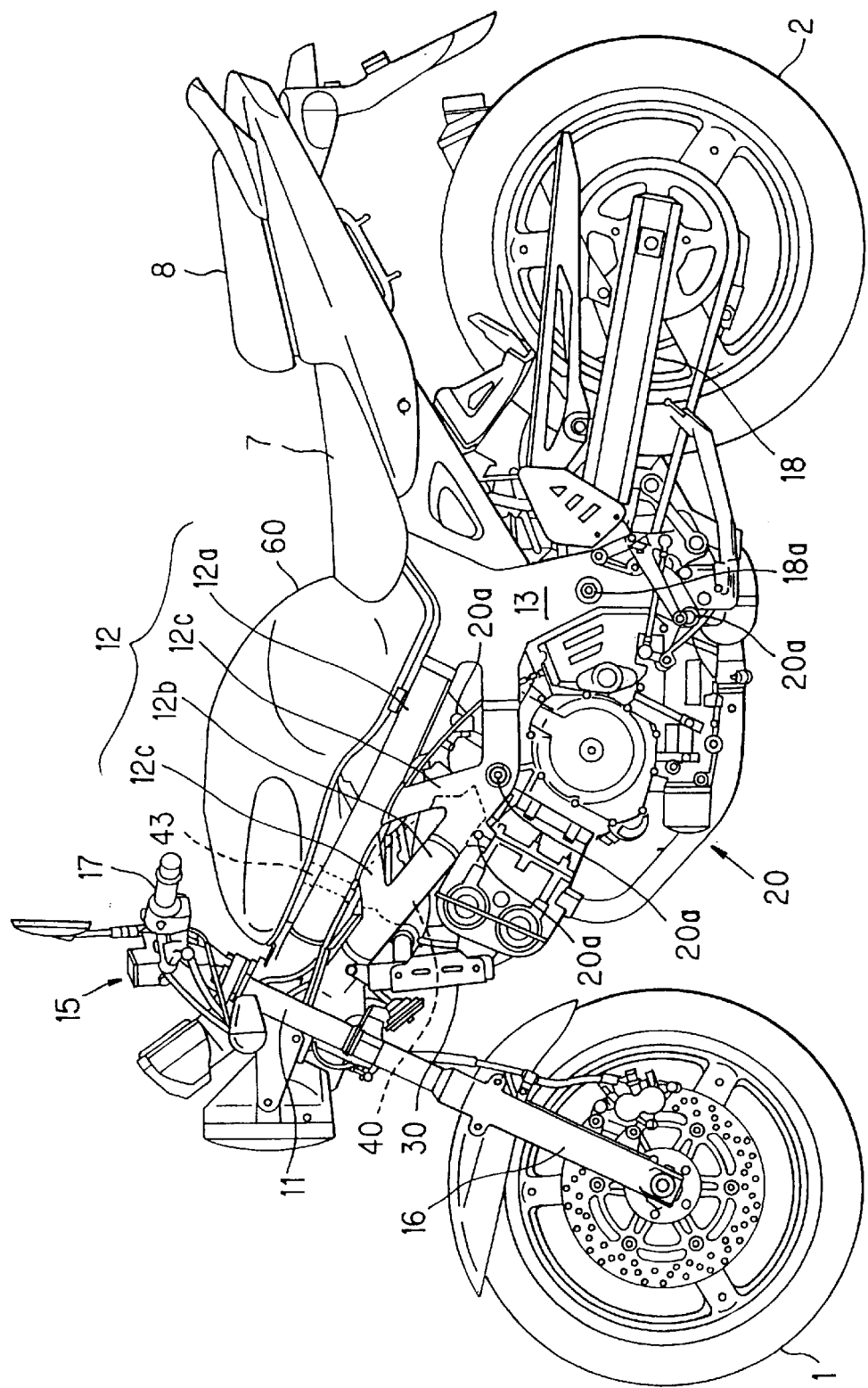
FIG. 1 is a left-side view showing a motorcycle to which the structure and arrangement of the reserve tank in accordance with the embodiment of the present invention is applied.
Figure 2:
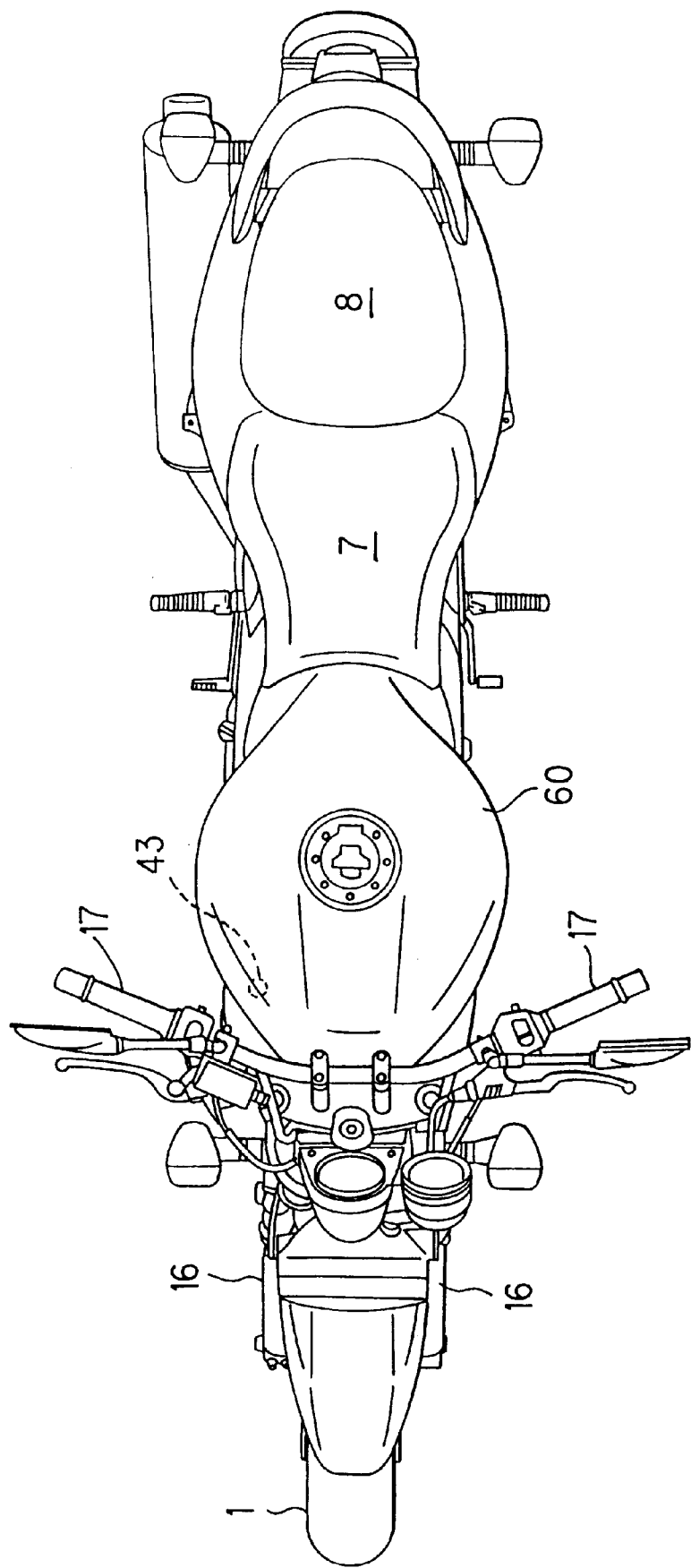
FIG. 2 is a plan view of the motorcycle shown in FIG. 1.
Figure 3A:
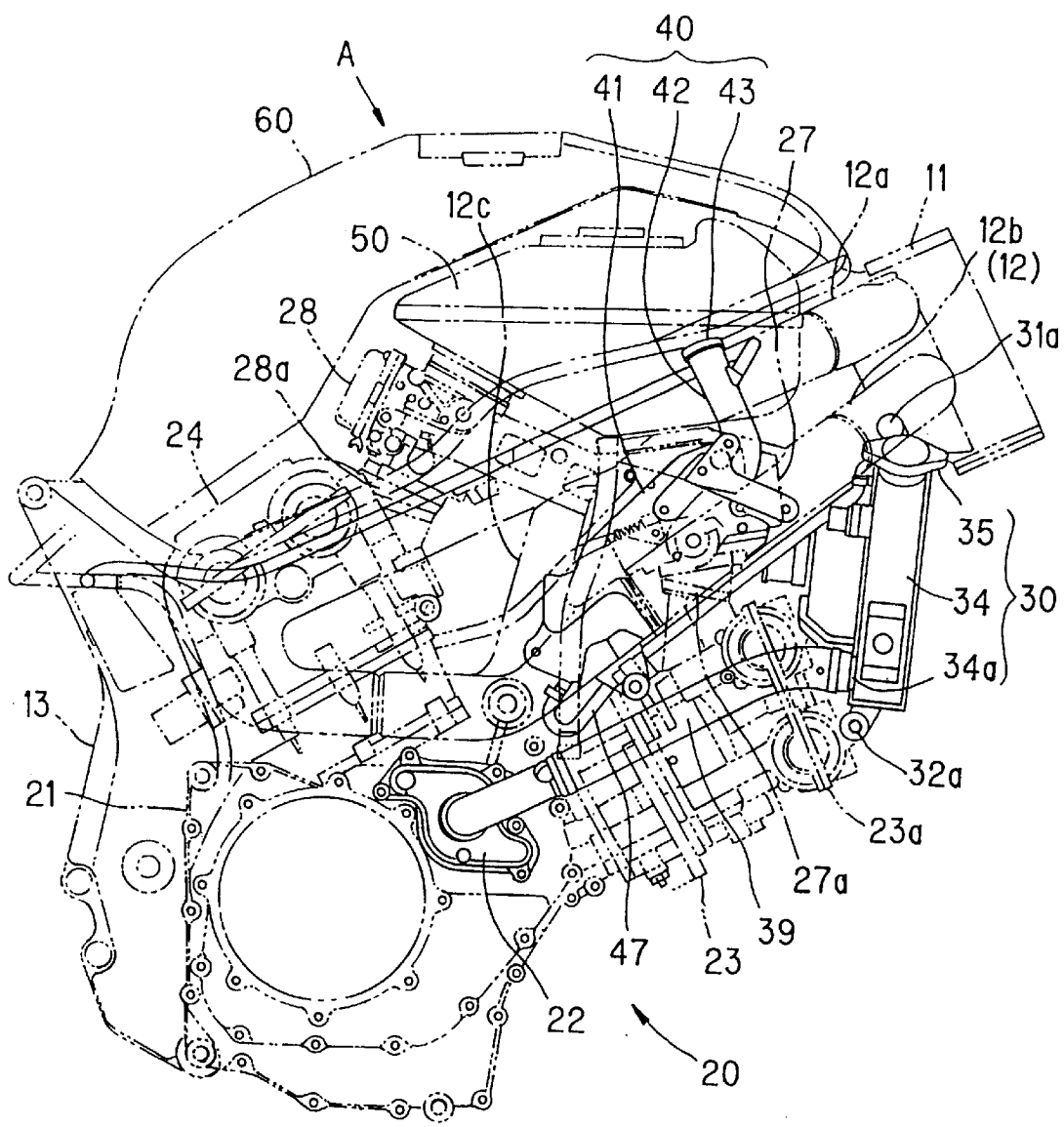
FIG. 3A is a right-side view showing the structure and arrangement of the reserve tank in FIG. 1.
Figure 3B:
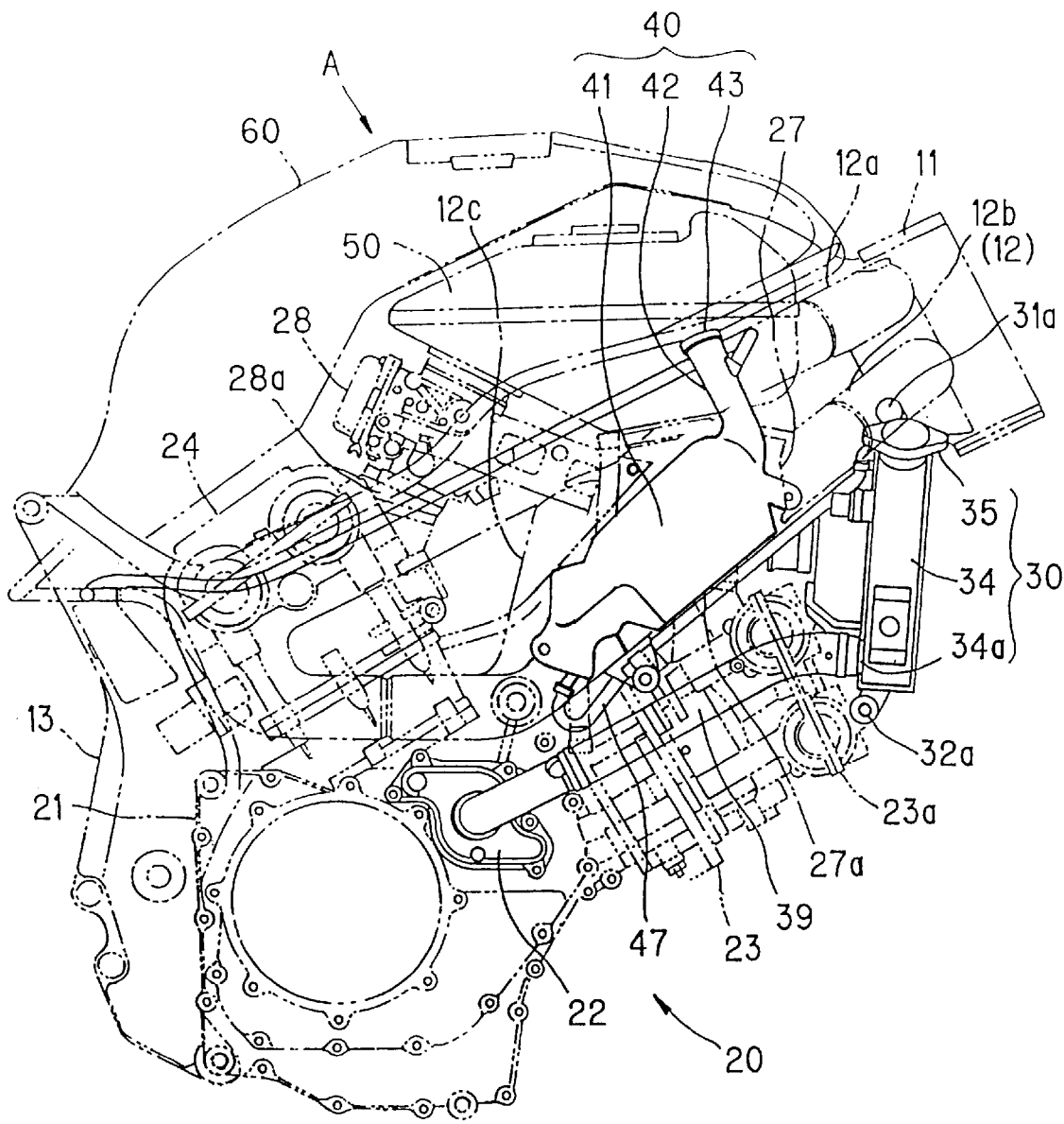
FIG. 3B is a modified version of FIG. 3A with certain elements removed to more clearly illustrate the reserve tank.
Figure 3C:
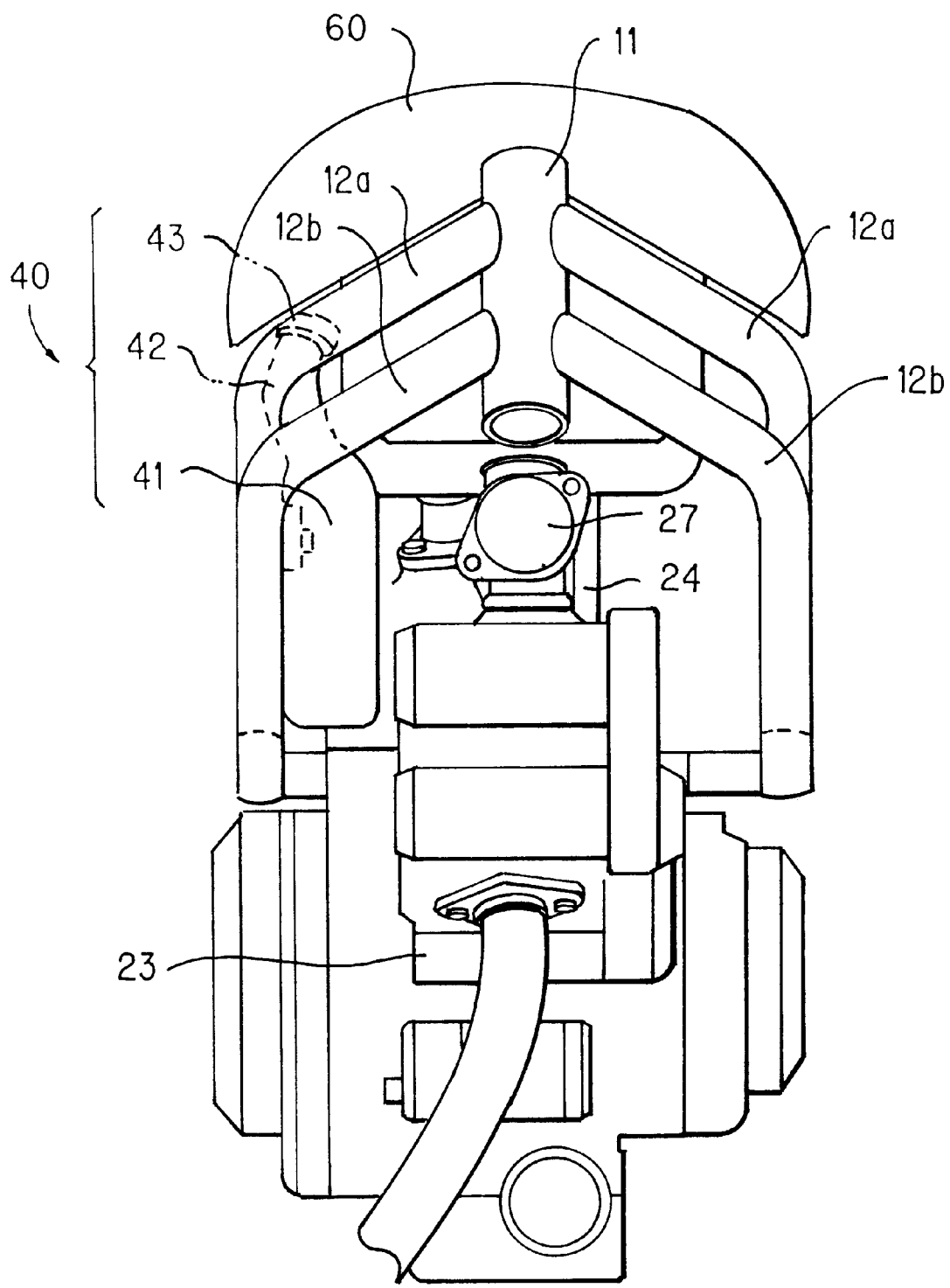
FIG. 3C shows a front view of a portion of the structure of FIG. 3A with the radiator omitted to expose the reserve tank.
Figure 4:
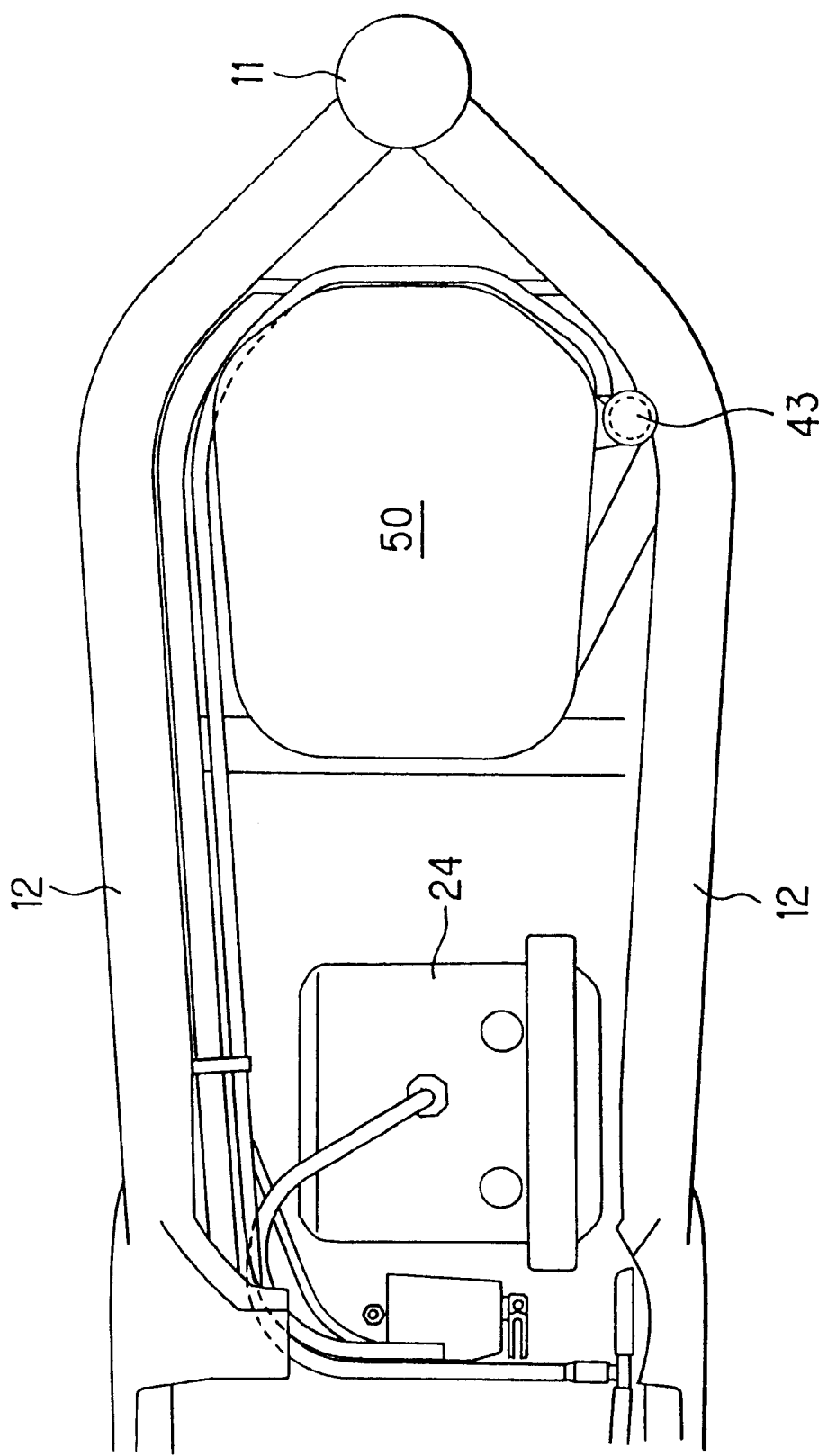
FIG. 4 is a view showing the structure and arrangement of the reserve tank, viewed from the direction of the arrow A in FIG. 3.

The embodiment of the present invention will hereinafter be described with reference to the accompanying drawings. FIG. 1 is a left-side view showing a motorcycle to which the structure and arrangement of the reserve tank in accordance with the embodiment of the present invention is applied. FIG. 2 is its plan view. FIG. 3A is a right-side view showing the structure and arrangement of the reserve tank in FIG. 1. FIG. 3B is a modified version of FIG. 3A with certain elements removed to more clearly illustrate the reserve tank and FIG. 3C shows a front view of a portion of the structure of FIG. 3A with the radiator omitted to expose the reserve tank. FIG. 4 is a view showing the structure and arrangement of the reserve tank, viewed from the direction of the arrow A in FIG. 3A.

The motorcycle to which the structure and arrangement of the reserve tank in accordance with the embodiment of the present invention is applied has a backbone type motorcycle frame as shown in FIGS. 1 and 2. The motorcycle frame is made up of a head pipe 11 at the front end, a truss frame (side rails) 12 that is bifurcated from head pipe 11 lower rearwards on both sides, a body frame 13 that is projected approximately downwards from the rear of truss frame 12, and the like. Here, each side of truss frame 12 is composed of an upper beam 12a, a lower beam 12b, middle reinforcing beams 12c, 12c and the like. Each beam in the truss frame has a greater size in its vertical dimension compared to the thickness in its transverse direction. These trusses, i.e., upper beam 12a, lower beam 12b and middle reinforcing beams 12c, 12c define window-like openings.

A steering device 15 is supported by head pipe 11 of the motorcycle frame so as to be turned left and right. Below steering device 15, a front wheel 1 is rotatably supported by front forks 16 and 16 while handlebars 17 are arranged in the upper part of steering device 15. A swing arm 18 is jointed below and in the rear of body frame 13 via a pivot 18a so that it can move up and down about the pivot. A rear wheel 2 is rotatably supported on the rear side of swing arm 18 so that the wheel can be driven by an aftermentioned engine 20. Provided in the upper part on the rear side of body frame 13 are seat rails (not shown) extending to the rear while front and rear seats 7 and 8 are placed on the seat rails.

A four stroke V-type two cylinder engine 20 is transversally mounted in front of body frame 13, being supported by truss frame 12 and body frame 13 via support bolts 20a, 20a . . . . As shown in FIGS. 3A–3C, engine 20 has two cylinders, i.e., front cylinder 23 and rear cylinder 24 forming a V-bank angle of about 90 degrees. Front cylinder 23 is offset to the left while rear cylinder 24 is offset to the right with respect to the center of engine 20 (or the vehicle's center). In the state that the engine is mounted in the motorcycle, front cylinder 23 is largely inclined forwards (inclined about 60 degrees forwards) and positioned below truss frame 12 while rear cylinder 24 is relatively closer to the vertical (inclined about 30 degrees rearwards) and arranged between left and right parts of truss frame 12.

A front carburetor 27 is attached to the upper side (V-bank side) of front cylinder 23 via an intake pipe 27a while a rear carburetor 28 is attached to the upper front side (V-bank side) of rear cylinder 24 via an intake pipe 28a. Front carburetor 27 and rear carburetor 28 are aligned with the centers of front cylinder 23 and rear cylinder 24, respectively. Therefore, front and rear carburetors 27, 28 are offset to the left and the right, respectively. Front carburetor 27 is arranged between left and right parts of truss frame 12 and rear carburetor 28 is arranged above truss frame 12. Arranged above carburetors 27 and 28 is an air cleaner 50. Mounted on the upper side of truss frame 12 is a fuel tank 60 enclosing the top and sides and rear of air cleaner 50.

A radiator 30 is laid out below and in front of truss frame 12 and in front of engine 20 so that it covers the front upper part of a cylinder head (cylinder head cover) 23a of front cylinder 23. This radiator 30 is supported by truss frame 12 and engine 20 via attachment bolts 31a and 32a. A radiator cap 35 is provided on the upper end of an outlet-side tank 34 which is located on the right side of radiator 30. A cooling water inlet is located at the upper right part of radiator 30 and is connected to the cooling water outlet of the water jacket of engine 20 via an upper radiator hose etc. (not shown). A cooling water outlet 34a located at the lower left end of radiator 30 is connected to the cooling water inlet of the water jacket of engine 20 via a lower radiator hose 39 and a water pump 22. The upper radiator hose is arranged on the left side of front carburetor 27 while lower radiator hole 39 is arranged on the right side of front cylinder 23.

A reserve tank 40 is provided on the right side of front carburetor 27 and on the left side (inner side) of right part of truss frame 12. Since front cylinder 23 and front carburetor 27 are offset to the left, the space on the right side of front carburetor 27 can be made use of to arrange a reserve tank 40 of an adequate capacity. Further, truss frame 12 is able to protect reserve tank 40. Main body 41 of reserve tank 40 is of a translucent material and is formed of a shape extending from the upper front side to the lower rear side along lower beam 12b of truss frame 12 with its height greater than the height of lower beam 12b and its distance from the front to the rear longer than the interval between middle reinforcing beams 12c and 12c. In this arrangement, the upper middle part of main body 41 is exposed from the window-like openings defined by upper beam 12a, lower beam 12b, middle reinforcing beams 12c and 12c of truss frame 12.

A cylindrical water supply port 42 which is projected upwards from main body 41 is formed on the front upper part of reserve tank 40. This water supply port 42 is arranged between air cleaner 50 and upper beam 12a of truss frame 12. As shown in FIGS. 2 and 4, the water supply opening (cap 43) located at the upper end of water supply port 42 is removably disposed with a cap 43 and is arranged above truss frame 12 so as to be covered from above by fuel tank 60. Here, fuel tank 60 is rotatably supported at its rear side so that its front side can move up and down to open and close itself. As shown in FIGS. 3A–3C, one end of an overflow hose 47 is connected to the lower rear part of reserve tank 40. This overflow hose 47 is extended forward and upward so that the other end of overflow hose 47 is connected to radiator cap 35.

In the structure and arrangement of the reserve tank thus configured, reserve tank 40 is located in the rear of radiator 30, so it will not interrupt the flow of air toward radiator 30 and hence will not degrade the cooling efficiency of radiator 30. Reserve tank 40 will absorb variation in volume of the cooling water due to change in pressure and temperature by allowing the cooling water to move in and out via drain hose 47 between the tank and radiator cap 35. In this configuration, since reserve tank is arranged in a space on the side opposite to the side to which front carburetor 27 is offset, it is possible to secure an adequate capacity for the reserve tank without enlarging the vertical dimensions of motorcycle body and hence it is possible to fully absorb the variation in volume of the cooling water.

Further, since reserve tank 40 is arranged within truss frame 12, the tank can be protected by truss frame 12 from being damaged if the motorcycle falls down or from other reasons. Also, since main body 41 of reserve tank 40 is exposed to the exterior through the window-like openings of truss frame 12, the amount of the cooling water in reserve tank 40 can be easily viewed through the window-like openings of truss frame 12. Further, since water supply port (cap 43) of reserve tank 40 is covered by fuel tank 60, it is possible to prevent such tampering as loading of foreign substances such as sand, fuel, etc.

Up to now, a specified embodiment of the present invention has been described, but the present invention should not be limited to the above embodiment. For example, in the above embodiment, the reserve tank is arranged at the side of the front carburetor or in an above and sideward position with respect to the front cylinder. However, the reserve tank may be arranged at the side of the front cylinder.

In accordance with the first feature of the invention, the sideways space opposite the side to which the front cylinder is offset or the upper sideways space can be made use of to arrange a reserve tank of an adequate capacity in the rear of the radiator without the necessity of enlarging the vertical dimensions of the motorcycle body. Accordingly, it is possible to absorb volume variation of the cooling water without degrading the cooling efficiency of the radiator.

In accordance with the second feature of the invention, a greater space at the side of the front carburetor can be made use of to facilitate simple arrangement of the reserve tank while securing an adequate capacity.

In accordance with the third and fourth features of the invention, the reserve tank can be protected by the motorcycle frame so that it can be prevented from being damaged even if the motorcycle falls down or from other reasons. It is also possible to prevent such tampering as loading of foreign substances such as sand, fuel, etc. into the water supply port of the reserve tank.

What is claimed is:

1. A structure and arrangement for a coolant reserve tank in a motorcycle, comprising:

a V-type engine having front and rear cylinders, the front cylinder being offset to a first side of the motorcycle and the second cylinder being offset to a second side of the motorcycle, the offset of the front cylinder establishing a sideways space between the front cylinder and extending towards the second side; and the reserve tank arranged in the sideways space established by the offset of the front cylinder.

2. The structure and arrangement of the reserve tank in a motorcycle according to claim 1, wherein a front carburetor is attached to a top of the front cylinder and the reserve tank is arranged at a side of the front carburetor.

3. The structure and arrangement of the reserve tank in a motorcycle according to claim 1, further comprising:

a motorcycle frame element arranged one of sideways and upwards and sidewards relative to the front cylinder; and a fuel tank mounted over the motorcycle frame, wherein the reserve tank is arranged on an inner side of the motorcycle frame, and the reserve tank has a water supply port disposed under the fuel tank.

4. The structure and arrangement of the reserve tank in a motorcycle according to claim 2, further comprising:

a motorcycle frame element arranged one of sideways and upwards and sidewards of the front cylinder;

and a fuel tank mounted over the motorcycle frame, wherein the reserve tank is arranged on an inner side of the motorcycle frame, and the reserve tank has a water supply port disposed under the fuel tank.

* * * * *